(12) United States Patent
Chew et al.

(10) Patent No.: US 8,339,986 B2
(45) Date of Patent: Dec. 25, 2012

(54) INSTRUMENTATION OF MPEG-2 TRANSPORT STREAMS FOR TESTING NETWORK PERFORMANCE

(75) Inventors: Chiat Earl Chew, Vancouver (CA); Laura Choy, Burnaby (CA); Kevin M. Cattell, North Vancouver (CA)

(73) Assignee: Ixia, Calabasas, CA (US)

( * ) Notice: Subject to any disclaimer, the term of this patent is extended or adjusted under 35 U.S.C. 154(b) by 304 days.

(21) Appl. No.: 11/590,394

(22) Filed: Oct. 31, 2006

(65) Prior Publication Data

US 2008/0101254 A1 May 1, 2008

(51) Int. Cl.
*H04J 3/14* (2006.01)
(52) U.S. Cl. ........................................ 370/253
(58) Field of Classification Search .......... 370/222, 370/224, 231, 232, 249, 253, 395.64, 242, 370/252, 390; 348/192
See application file for complete search history.

(56) References Cited

U.S. PATENT DOCUMENTS

| | | | | |
|---|---|---|---|---|
| 5,654,751 A * | 8/1997 | Richard, III | ............... | 348/192 |
| 6,181,697 B1 * | 1/2001 | Nurenberg et al. | ........... | 370/390 |
| 6,801,544 B1 * | 10/2004 | Rijckaert et al. | .............. | 370/473 |
| 7,321,565 B2 * | 1/2008 | Todd et al. | .................... | 370/253 |
| 2004/0233852 A1 * | 11/2004 | Ochi et al. | .................... | 370/242 |

OTHER PUBLICATIONS

Aglient Technologies, "IPTV QoE: Understanding and Interpreting MDI Values," a white paper, http://cp.literature.agilent.com/litweb/pdf/5989-5088EN.pdf (Aug. 30, 2006).
Welch et al., "A Proposed Media Delivery Index (MDI)," Network Working Group, RFC 4445, http://www.rfc-editor.org/rfc/rfc4445.text (Apr. 2006).

* cited by examiner

*Primary Examiner* — Yemane Mesfin
*Assistant Examiner* — Leon Andrews
(74) *Attorney, Agent, or Firm* — Jenkins, Wilson, Taylor & Hunt, P.A.

(57) ABSTRACT

A method and apparatus for testing and measuring the performance of a network for delivering multimedia is disclosed. A multimedia source is divided into data packets according to a packetizing standard. Each data packet includes a header and a payload containing a portion of the multimedia. N data packets (N>0) are grouped together into a packet bundle. Then, instrumentation is inserted into the header of at least one data packet within the packet bundle. The instrumentation includes information used in determining performance characteristics of the network.

15 Claims, 3 Drawing Sheets

INSTRUMENTATION OF MPEG-2 TRANSPORT STREAMS FOR TESTING NETWORK PERFORMANCE

BACKGROUND OF THE INVENTION

Telecommunication networks are carrying increasing amounts of digital multimedia content (e.g. video and/or audio data). Standards have been developed for transporting digital multimedia content across the networks. Part 1 (Systems) of the Moving Pictures Expert Group (MPEG-2) standard defines a Transport Stream (TS) for carrying multimedia content across somewhat unreliable mediums such as broadcast channels, internet protocol networks, etc. The transport stream consists of packets that carry video or audio data in their payload. The data may be compressed to maximize usage of the bandwidth available, although data compression of the payload is not a requirement of the Transport Stream standard.

The digital multimedia content must be transported across the network in a reliable and timely manner to the end user. Streaming video services (e.g. Internet Protocol television (IPTV), video conferencing, video-on-demand, etc.) are especially sensitive to delay, jitter, or data loss, which can all negatively impact the quality of the end user's experience.

Determining the performance of a network that carries digital multimedia content is an important element to the successful design and operation of such a network. Some network parameters that are commonly determined include latency, jitter, and packet loss. Another measure of a network's performance is known as the Media Delivery Index (MDI). The MDI has two components: the delay factor (DF) and the media loss rate (MLR). The MDI is expressed as two numbers separated by a colon: DF:MLR.

The DF component of the MDI is the maximum difference, observed at the end of each network packet, between the arrival of media data and the drain of media data. To calculate DF, consider a virtual buffer VB used to buffer received packets of a stream. When a packet $P_i$ arrives during a measurement interval, compute two VB values, VB(i,pre) and VB(i,post) as follows:

$$VB(i, pre) = \sum_{j=1}^{i-1} S_j - MR * T_i \quad (1)$$

$$VB(i, post) = VB(i, pre) + S_i \quad (2)$$

where $S_j$ is the media payload size of the $j^{th}$ packet, $T_i$ is the time, relative to the previous packet, at which packet i arrives in the interval, and MR is the nominal media rate in bytes per second. VB(i,pre) is the virtual buffer size just before the arrival of $P_i$, and VB(i,post) is the virtual buffer size just after the arrival of $P_i$. This calculation is subject to the initial condition of VB(0,post)=VB(0,pre)=0 at the beginning of each measurement interval. A measurement interval is defined from just after the time of arrival of the last packet during a nominal period (typically 1 second) to the time just after the arrival of the last packet of the next nominal period. The DF is calculated as follows:

$$DF = \frac{\max(VB(i, post)) - \min(VB(i, pre))}{MR} \quad (3)$$

The MLR is simply defined as the number of lost or out-of-order packets per second.

For more information regarding the MDI, DF, and MLR measurements, please refer to the following publications: "A Proposed Media Delivery Index (MDI)", by J. Welch and J. Clark, published in April 2006 by the Internet Engineering Task Force as IETF RFC 4445 and available at the following URL: http://www.rfc-editor.org/rfc/rfc4445.txt; and "IPTV QoE: Understanding and Interpreting MDI Values", a white paper published by Agilent Technologies on Aug. 30, 2006 and available at the following URL: http://cp.literature.agilent.com/litweb/pdf/5989-5088EN.pdf Prior art methods for measuring delay factor are unsatisfactory for several reasons. For one thing, the prior art methods are not very accurate. For example, the typical value used for the media rate MR in equations (1) and (3) is the advertised bit rate at which the data is to be consumed at its destination. However, the advertised bit rate is only an approximation because it only includes the video stream, not the audio stream or other meta data (e.g. program guide information that might be embedded in the TS packet stream) While it is possible to restrict the measurement of the DF to video packets only, thus addressing the rate approximation issue, this results in more complicated and inferior measurements for network performance. Furthermore, the actual bit rate will vary depending on the accuracy of the encoder for the data bitstream. The encoder will do its best to achieve the advertised bit rate, but in reality can only approximate it.

Some prior solutions also required that the payload in the packets be filled with instrumentation data, which rendered the packets incapable of containing valid multimedia data. However, it is desirable to keep the multimedia data within the transport stream packet intact, so as to recreate actual network conditions as closely as possible.

Therefore, there remains a need for improved performance testing of a network carrying multimedia traffic, in particular streaming video content.

SUMMARY OF THE INVENTION

A method and apparatus for testing and measuring the performance of a network for delivering multimedia is disclosed. A multimedia source is divided into data packets according to a packetizing standard. Each data packet includes a header and a payload containing a portion of the multimedia. N data packets (N>0) are grouped together into a packet bundle. Then, instrumentation is inserted into the header of at least one data packet within the packet bundle. The instrumentation includes information used in determining performance characteristics of the network.

DETAILED DESCRIPTION

Figure 1:
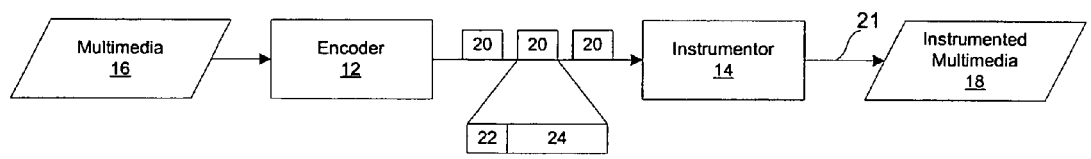
FIG. 1 shows a block diagram of a system for creating instrumented multimedia for testing the performance of a network, according to embodiments of the present invention.

FIG. 1 shows a block diagram of a system 10 for creating instrumented multimedia 18 for testing the performance of a network, according to embodiments of the present invention. In one embodiment, the system 10 includes an encoder 12 and an instrumentor 14. A multimedia source 16 is provided as input to the system 10. The multimedia source 16 can be any video or audio data.

In one embodiment, the multimedia source 16 has also been compressed to maximize usage of available network bandwidth. For the sake of convenience, all examples and illustrations hereinafter shall assume that MPEG-2 is the compression standard being used. However, it should be noted that other forms of compression and encoding may also be used without departing from the teachings of the present invention. It should further be noted that compression of the multimedia source may be omitted entirely without departing from the teachings of the present invention, although more network bandwidth would be required to transport uncompressed data. In an actual reduction to practice, the multimedia source 16 is a short, e.g. 10 second duration, MPEG-2 or H.264 encoded video clip, packetized according to the MPEG-2 Transport Stream standard.

The encoder 12 encodes the multimedia source 16 according to user-specified parameters such as resolution, bitrate, framing rate, etc. to make the multimedia source 16 compatible with the equipment of the end user. For example, users in the United States will need to test networks having NTSC receivers, whereas users in Europe will want to test networks having PAL receivers. The encoder 12 encodes the multimedia source 16 into the proper format for the desired type of receiver. The output of the encoder 12 is transport stream (TS) packets 20, according to the MPEG-2 Transport Stream standard. Typically, each TS packet 20 has a fixed size of 188 bytes, although there are some variations. For example, some systems add additional bytes to the TS packet for error correction purposes. The TS packet 20 includes a header 22 and a payload 24. The payload 24 consists of data from the multimedia source.

Figure 2:
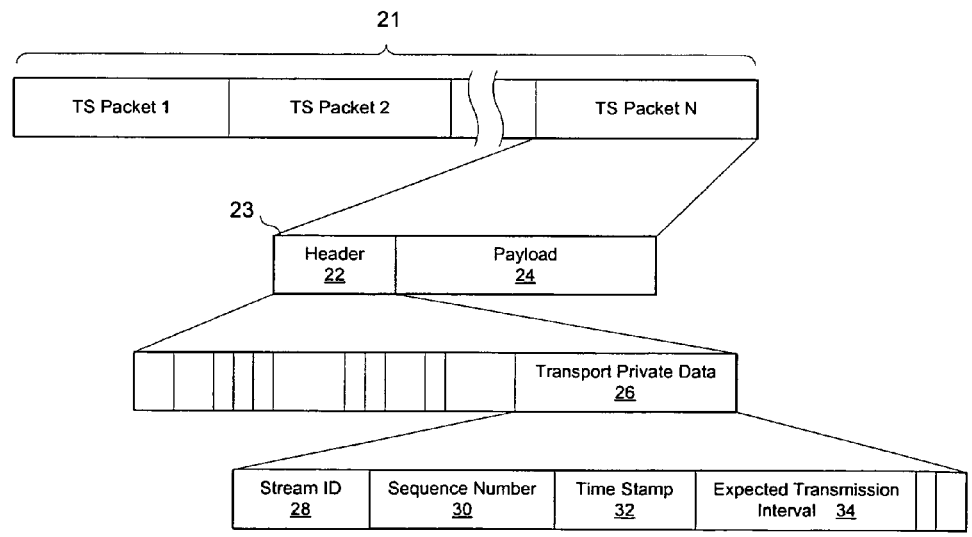
FIG. 2 shows an exemplary bundle of N Transport Stream packets, according to embodiments of the present invention.

Refer now to FIG. 2. The instrumentor 14 bundles N TS packets together (TS packet bundle 21) in preparation for transmittal across a network, where N is any integer greater than 0. The instrumentor 14 also allocates space within one of the N TS packets to carry instrumentation. As used herein, "instrumentation" refers to data or information that will be used to test the performance of the network across which the TS packet bundle 21 is to be transported.

The number of TS packets that can be bundled together depends on various factors, including the type of network across which the bundles are to be transported. In an actual reduction to practice, the instrumentor 14 groups seven TS packets together at a time in a bundle for transport in an Ethernet packet across an internet protocol (IP) network. This bundling of the TS packets increases the amount of actual data that can be carried in the aggregate payloads of a TS packet bundle 21, since it decreases the amortized overhead taken up by the instrumentation. The more TS packets that are grouped together in a bundle, the greater the savings.

In every group of N TS packets, the instrumentor 14 designates one TS packet (instrumented TS packet 23) in which to insert instrumentation. It is not important which TS packet is designated, so long as the selection of which TS packet to instrument can be determined by the receiver. In an actual reduction to practice, the seventh TS packet is instrumented, although any TS packet could be selected without departing from the teachings of the present invention.

The instrumentation is carried within the header 22 of the instrumented TS packet 23. The MPEG-2 TS standard defines a space within each header 22 of a TS packet that can be used for optional fields, including a transport private data field 26.

The instrumentor 14 allocates space within the transport private data field 26 of an instrumented TS packet 23 for carrying instrumentation. This added instrumentation will take up space within the instrumented TS packet 23 and displace existing data. Thus, the displaced data must be shifted or reallocated. Generally, this requires the creation of additional TS packets to accommodate the data displaced by the instrumentation, and by implication, an increase in the Transport Stream bit rate.

There are four main types of instrumentation to be included in the transport private data field 26. First, there is a stream identification (ID) 28, which identifies each TS packet bundle 21 as belonging to a particular program or multimedia file. The value in this field should be the same for all TS packet bundles 21 within the multimedia file. This field can be filled in at the same time the instrumentor 14 allocates space for instrumentation, if the TS packets are to be sent in only a single channel. However, the instrumented multimedia 18 can be used to simulate several different channels. If this is the case, this field should remain blank and be filled in at the time of transmission with the stream ID of the channel to be simulated. In an actual reduction to practice, four bytes were allocated to this field.

There is also a field for a sequence number 30. The sequence number 30 indicates the numerical order in which the TS packet bundles 21 should be played back to recreate the original multimedia source 16, and indicates whether there is or has been any packet loss. This field may be populated by the instrumentor 14 at the time the TS packet bundles 21 are formed, although the sequence number 30 may need to be adjusted at the time of transmission, for reasons to be explained further below. In an actual reduction to practice, four bytes were allocated to this field as well.

Next, there is a field for a time stamp 32. This field is populated with the time of transmission of the TS packet bundle 21, and is useful in measuring both jitter and latency of a network under test. In an actual reduction to practice, four bytes were allocated to this field, to accommodate a timestamp with 10 nanoseconds (ns) of resolution.

Finally, there is a field for the expected transmission interval 34. The expected transmission interval 34 is the expected amount of time that will pass between transmission of the first bit of the current TS packet bundle 21 and the first bit of the next TS packet bundle. For example, to calculate the expected transmission interval 34 for a single program constant bit rate video clip, the instrumentor 14 divides the total length of time it takes to play the multimedia source 16 by the total number of packets that are needed to transmit the instrumented multimedia 18. If the multimedia source 16 is a 10 second video clip, and there are 10,000 packets required to play the clip, then the expected transmission interval for each packet is 10 seconds/10,000 packets=1 millisecond/packet. This number is adjusted to account for the behavior of the transmitter (such as delays or inaccuracies introduced by the transmitter) and obtain a more accurate value for the expected transmission interval 34. If the underlying multimedia source 16 is a variable bit rate, or if there are multiple programs contained therein, then this calculation must also be adjusted accordingly.

This expected transmission interval 34 simplifies calculation of the delay factor, as will be explained below. In an actual reduction to practice, two bytes were allocated to this field. This field can be filled in at the time the TS packet bundles 21 are formed.

Other items may be inserted into the Transport Private Data field 26. For example, error correction bits may be used to verify the instrumentation data being sent.

The amount of space allocated in the TS packet 20 for the instrumentation will depend on how much instrumentation is to be inserted. Given that each TS packet 20 typically has a fixed size, any space taken up by the instrumentation leaves less space available that can be devoted to the actual payload. In an actual reduction to practice, the instrumentation takes up 20 bytes of the Transport Private Data field 26. The MPEG-2 Transport Stream requires that the amount of space actually allocated to the Transport Private Data field 26 also be announced in the header 22 as well.

Since the TS packets are bundled together by the instrumentor 14 for transmission, the amount of overhead required for the instrumentation is minimal. As previously mentioned, each TS packet is 188 bytes long, with seven TS packets bundled together by the instrumentor. Each grouping of seven TS packets is 1316 bytes long. Thus, the instrumentation takes up only 20 out of 1316 bytes. This minimal amount of instrumentation takes very little away from the payload capacity of the TS packets 20.

Referring back to FIG. 1, the output of the instrumentor 14 is instrumented multimedia 18, consisting of TS packet bundles 22, wherein one TS packet in each bundle has been designated to carry instrumentation within its header 20. This instrumented multimedia 18 can be passed directly to a transmitter, or saved onto storage media (e.g. floppy disk, CD-ROM, DVD, hard drive, flash memory, etc.) for later use. The instrumented multimedia is syntactically correct and playable since it contains all the multimedia content from the original source, and is thus visually indistinguishable from the original uninstrumented clip.

The encoder 12 and the instrumentor 14 can be implemented using any combination of hardware or software desired. In an actual reduction to practice, the encoder 12 and instrumentor 14 were implemented using software installed on a computer.

Figure 3:
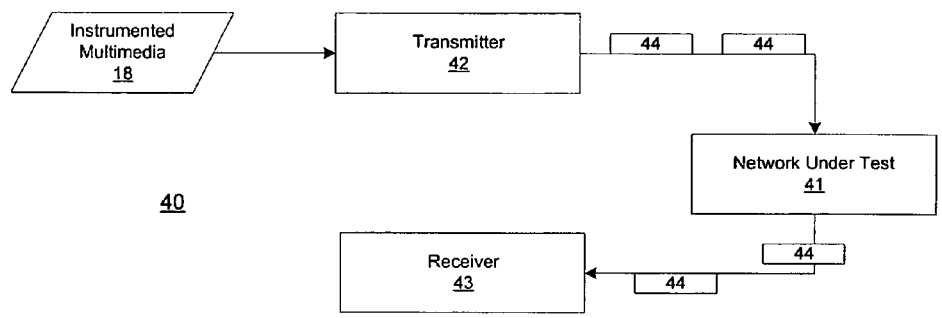
FIG. 3 shows a system for testing the performance of a network that transports digital multimedia.

FIG. 3 shows a system 40 for testing the performance of a network under test 41 that transports digital multimedia. The system includes a transmitter 42 and a receiver 43. The input to the system 40 is the instrumented multimedia 18 from FIG. 1. The transmitter 42 wraps each TS packet bundle 21 from the instrument multimedia 18 in the proper frame, resulting in an instrumented network packet 44 that is sent through the network under test 41 to the receiver 43.

Figure 4:
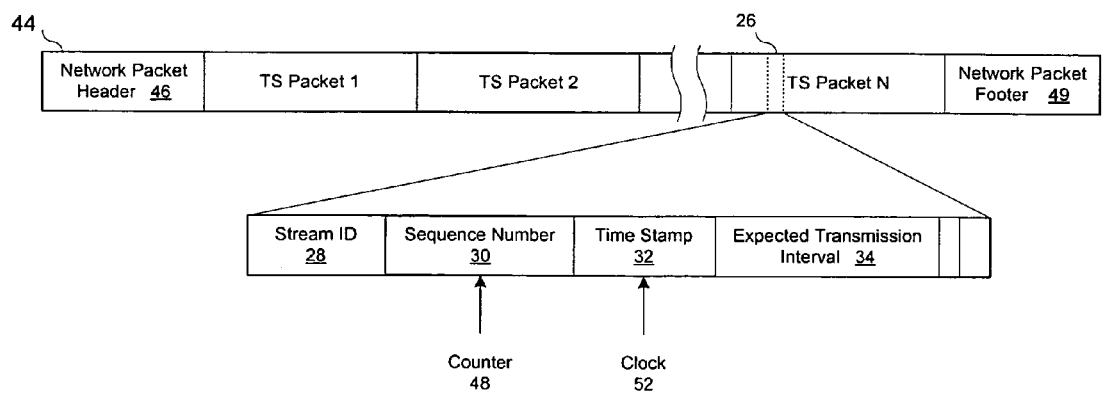
FIG. 4 shows an exemplary instrumented network packet.

An exemplary instrumented network packet 44 is shown in FIG. 4. Each instrumented network packet 44 includes a network packet header 46, a network packet footer 49 (e.g. a checksum or CRC error correction field), and N TS packets that were bundled together by the instrumentor 14. Before transmitting each instrumented network packet 44, the transmitter 42 inserts or adjusts any necessary instrumentation into the transport private data field 26 of the designated TS packet. The designated TS packet as illustrated in FIG. 4 is the Nth one in the bundle, although any TS packet can be designated to receive the instrumentation.

The different kinds of instrumentation are entered into the private transport data field 26 of a designated TS packet as previously described. The transmitter 42 enters a stream ID 28, which indicates that all of the packets originate from the same multimedia source. The stream ID is determined by the desired test configuration, e.g. how many channels are to be simulated and where the channels are to be sent.

A counter 48 inserts a sequence number 30 for each instrumented network packet 44 that is transmitted. If the desired duration of testing the network is longer than the duration of the instrumented multimedia 18, the transmitter 42 can loop the instrumented multimedia repeatedly to generate enough instrumented network packets 44 for the duration of the test. The transmitter 42 increments the sequence number 30 accordingly when the instrumented multimedia 18 is looped to simulate a single continuous multimedia clip of arbitrary length. The transmitter 42 also maintains proper syntax and clocking of the transmission so that the looping is performed seamlessly and is invisible to the receiver 43.

A clock 52 in the transmitter 42 applies a time stamp 32 at the time the instrumented network packet 44 is transmitted. In an actual reduction to practice, the time stamp 32 has 10 nanoseconds (ns) of resolution.

The expected transmission interval 34 was previously filled by the instrumentor 14.

In one embodiment, the network under test 41 is an internet protocol (IP) network, and the instrumented network packets 44 are framed according to Ethernet protocol. Typically, seven MPEG-2 TS packets can be carried in a single Ethernet packet (although this number may vary, as there can be fewer than seven TS packets).

After passing through the network under the test 41, the instrumented network packets 44 are received at the receiver 43. The receiver 43 includes a clock (not shown) that is synchronized to the clock 52 in the transmitter 42. The receiver 43 extracts the instrumentation information from the instrumented network packet 44. The embedded instrumentation information makes characterization of the network under test 41 much simpler and more accurate to do.

To calculate the delay factor, the receiver 43 extracts the expected transmission interval 34. The amount of time it will take to "drain" or consume the instrumented network packet 44 is equal to the time between transmission of successive network packets 44. Therefore, the expected transmission interval 34 can be interpreted as the length of time until the next network packet will arrive. This could also be determined by subtracting successive transmission time stamps, but would either require more hardware to perform look ahead, or also be affected by transmission jitter and loss.

If the virtual buffer VB used in calculating DF is defined in terms of the expected transmission interval 34, there is no need to rely on an approximation of the media rate. The expected transmission interval now describes how much time it will be before the next packet is supposed to arrive. As a result, the virtual buffers can now be calculated as follows:

$$VB_{new}(i, \text{pre}) = \sum_{j=1}^{i-1} ETI_j - T_i \quad (4)$$

$$VB_{new}(i, \text{post}) = VB_{new}(i, \text{pre}) + ETI_i \quad (5)$$

where $VB_{new}$ is the virtual buffer defined in terms of the expected transmission interval rather than a media rate, $TD_j$ is the value extracted from the $j^{th}$ expected transmission interval 34, and $T_i$ is the time, relative to the previous packet, at which packet i arrives in the measurement interval.

This calculation also is subject to the initial condition of $VB_{new}(0,\text{post})=VB_{new}(0,\text{pre})=0$ at the beginning of each measurement interval. A measurement interval is defined from just after the time of arrival of the last packet during a nominal period (typically 1 second) to the time just after the arrival of the last packet of the next nominal period.

The calculation for the delay factor for the interval ending in packet i now becomes:

$$DF = \max_{j=0\ldots i}(VB_{new}(j,\text{post})) - \min_{j=0\ldots i}(VB_{new}(j,\text{pre})) \quad (6)$$

To calculate packet loss, the receiver 43 compares the sequence numbers 30 in the network packets 44 received to determine whether any packets have been lost or whether any sequencing errors (e.g. out-of-sequence packets) have occurred.

To calculate the network latency, the receiver 43 compares the time at which a network packet 44 was received with the timestamp 32 embedded into the network packet when it was transmitted.

To calculate network jitter, the receiver 43 compares the variations in network latency calculated for each packet.

A combination of hardware and software may be used to perform these computations.

As described herein, instrumentation of the MPEG-2 transport stream packets permits the accurate measurement of the MDI (DF:MLR), network latency, jitter and packet loss on a network carrying actual multimedia traffic in a MPEG-2 Transport Stream. By allowing actual multimedia data to be included in the payloads, a more realistic test of the network can be carried out. Furthermore, any multimedia playback devices (e.g. a digital television or computer connected to the Internet) connected to the network under test 41 will look and operate normally because valid multimedia content is being carried in the payloads of the TS packets.

Although the present invention has been described with respect to TS packets contained in Ethernet packets transmitted over an IP network, it is equally applicable to other types of multimedia transmission systems, e.g. satellite transmission, cable television, broadcast airwaves, etc.

Figure 5:
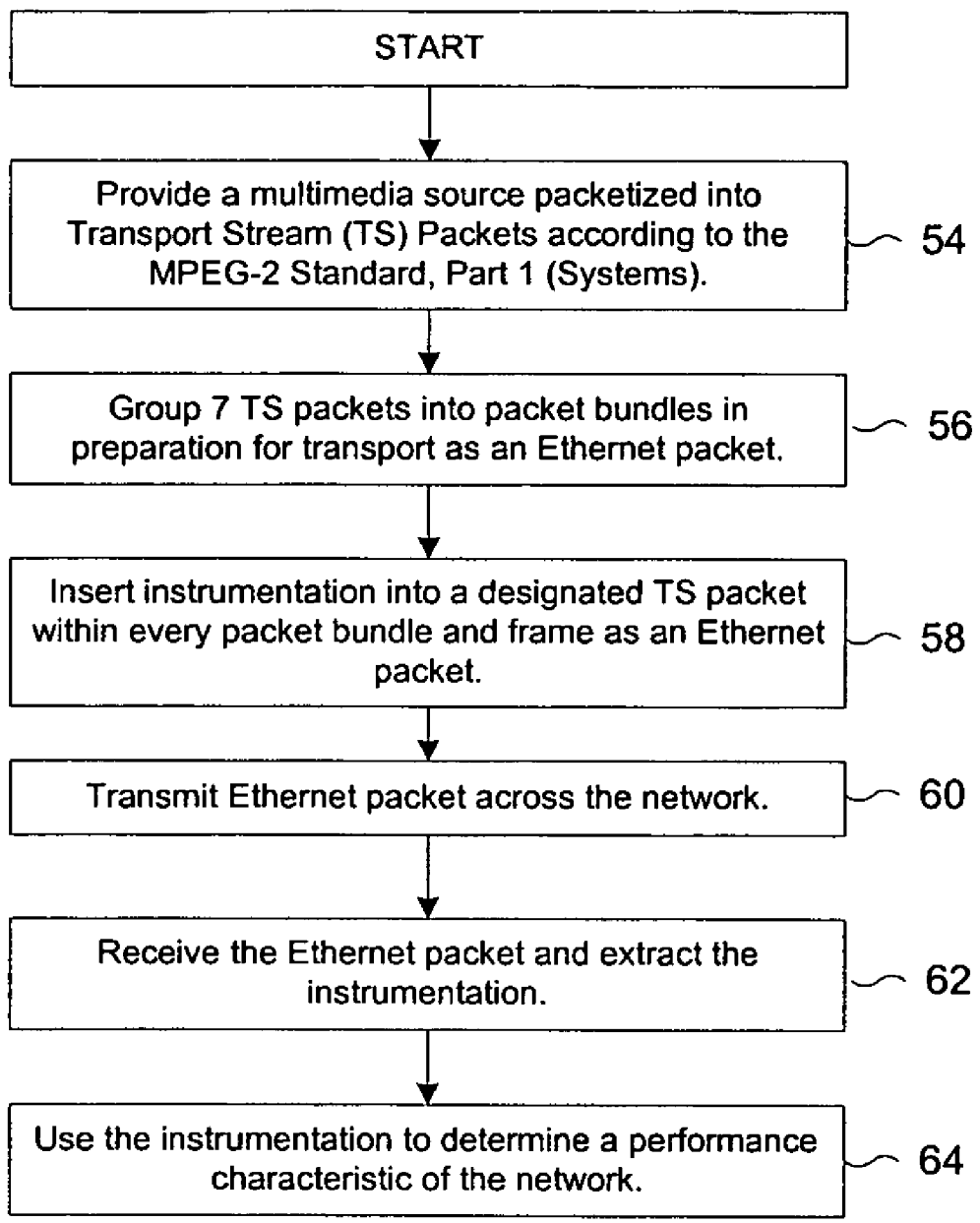
FIG. 5 shows a flowchart for a method according to embodiments of the present invention.

FIG. 5 shows a flowchart for a method of measuring the performance of a network that delivers multimedia, according to embodiments of the present invention. First in step 54, a multimedia source is provided. The multimedia source is packetized into TS Packets according to the MPEG-2 Standard, Part 1 (Systems). Next in step 56, the TS packets are grouped into packet bundles in preparation for transmission as Ethernet packets, Each packet bundle includes 7 TS packets. Then in step 58, instrumentation is inserted into a designated TS packet within each packet bundle. The instrumentation includes information such as the expected transmission interval between successive Ethernet packets, a time stamp for the time of transmission, a sequence number for the Ethernet packet, and a stream ID. The packet bundle is framed as an Ethernet packet in preparation for transmission.

The Ethernet packet is transmitted across the network in step 60. Then in step 62, the Ethernet packet is received and the instrumentation is extracted from the designated TS packet. Finally in step 64, the instrumentation is used to determine a performance characteristic for the network, such as a delay factor, a media loss rate, jitter, packet loss, latency, etc.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method of testing a network for delivering multimedia data comprising:
providing a multimedia source divided into data packets according to a packetizing standard, each data packet including a header and a payload containing a portion of the multimedia data;
forming packet bundles by grouping N data packets together into each packet bundle, where N>O;
inserting instrumentation in the header of at least one data packet within each packet bundle to create an instrumented packet, the instrumentation including information for determining at least one performance characteristic of the network, wherein the instrumentation includes an expected transmission interval that represents the expected amount of time between transmission of a current packet bundle and transmission of a next packet bundle and wherein the expected transmission interval comprises a computed value that is based on an amount of time required to play media carried by a packet bundle;
transmitting the packet bundles across the network; and
receiving one of the packet bundles, extracting the expected transmission interval from the instrumented packet within the bundle, and using the expected transmission interval to calculate the at least a delay factor of the network.

2. The method of claim 1, wherein the expected transmission interval is used to calculate a performance characteristic selected from the group consisting of: media loss rate, latency, jitter, and packet loss.

3. The method of claim 1, wherein the packetizing standard is the Transport Stream Format specified in Part 1 (Systems) of the Moving Pictures Experts Group (MPEG-2) standard.

4. The method of claim 3, wherein the instrumentation is inserted into a Transport Private Data field of the header.

5. The method of claim 1, wherein transmitting the packet bundles across the network is performed by a streaming video service selected from the group consisting of: Internet Protocol Television (IPTV), video-on-demand, and video conferencing.

6. The method of claim 1, wherein each packet bundle is framed and transmitted in a network packet, wherein the network packet conforms to a specified network protocol.

7. The method of claim 6, wherein the network packet is an Ethernet packet.

8. The method of claim 1, wherein inserting instrumentation includes inserting a time stamp for the time of transmission of the packet bundle.

9. The method of claim 1, wherein inserting instrumentation includes inserting a sequence number for the packet bundle.

10. The method of claim 1, further comprising looping transmission of the data packets to lengthen testing.

11. A method for creating instrumented multimedia for testing a network that carries multimedia comprising:
providing a multimedia source divided into data packets according to a packetizing standard, each data packet including a header and a payload containing a portion of the multimedia;
grouping N data packets together into a packet bundle, where N>O;
inserting instrumentation in the header of at least one data packet within the packet bundle to create an instrumented packet, the instrumentation including information used in determining performance characteristics of the network, wherein the instrumentation includes an expected transmission interval that represents the expected amount of time between transmission of a current packet bundle and transmission of a next packet bundle and wherein the transmission interval comprises a computed value that is based on an amount of time required to play media carried by a packet bundle;
saving the instrumented packet and data packets onto a storage media;
transmitting the packet bundles across the network; and receiving one of the packet bundles, extracting the expected transmission interval from the instrumented packet within the bundle, and using the expected transmission interval to calculate the at least a delay factor of the network.

12. The method of claim 11, wherein the packetizing standard is the Transport Stream Format specified in Part 1 (Systems) of the MPEG-2 standard.

13. The method of claim 12, wherein the instrumentation is inserted into the Transport Private Data field of the header.

14. The method of claim 1, where $N \geqq 2$.

15. The method of claim 11, where $N \geqq 2$.

* * * * *